US008266090B2

(12) United States Patent
Crawford et al.

(10) Patent No.: US 8,266,090 B2
(45) Date of Patent: Sep. 11, 2012

(54) COLOR-CODED VISUAL COMPARISON OF DECISION LOGIC

(75) Inventors: Stuart L. Crawford, Piedmont, CA (US); Michael Steele, Michigan City, IN (US); Navin Doshi, Karnataka (IN); Sergei Tolmanov, Walnut Creek, CA (US); Kashyap Babu Rao Kolipaka, Karnataka (IN); Gaurav Chhaparwal, Rajasthan (IN); Megan Thorsen, Sunnyvale, CA (US); Chris Erickson, El Cerrito, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 1048 days.

(21) Appl. No.: 12/201,555

(22) Filed: Aug. 29, 2008

(65) Prior Publication Data

US 2009/0063389 A1    Mar. 5, 2009

(30) Foreign Application Priority Data

Aug. 31, 2007 (IN) .......................... 1847/DEL/2007

(51) Int. Cl.
*G06F 9/44* (2006.01)
*G06N 7/02* (2006.01)

(52) U.S. Cl. .............................. 706/52; 706/46; 706/45

(58) Field of Classification Search ..................... None
See application file for complete search history.

(56) References Cited

U.S. PATENT DOCUMENTS

| | | |
|---|---|---|
| 5,515,487 A | 5/1996 | Beaudet et al. |
| 5,528,735 A | 6/1996 | Strasnick et al. |
| 5,537,630 A | 7/1996 | Berry et al. |
| 5,546,529 A | 8/1996 | Bowers et al. |
| 5,603,025 A | 2/1997 | Tabb et al. |
| 5,608,898 A | 3/1997 | Turpin et al. |
| 5,623,541 A | 4/1997 | Boyle et al. |
| 5,644,686 A | 7/1997 | Hekmatpour |

(Continued)

FOREIGN PATENT DOCUMENTS

EP    0690367    1/1996

(Continued)

OTHER PUBLICATIONS

Pook, Stuart, et al. "Context and Interaction in Zoomable User Interfaces," (ACM Press) pp. 227-231 & 317, May 2000, Palermo, Italy.

(Continued)

*Primary Examiner* — Jeffrey A Gaffin
*Assistant Examiner* — Adrian Kennedy
(74) *Attorney, Agent, or Firm* — Mintz, Levin, Cohn, Ferris, Glovsky and Popeo, P.C.

(57) ABSTRACT

A request to compare strategies is received. The first strategy can be graphically represented by a first set of linked nodes arranged in a first form of decision logic. The second strategy can be graphically represented by a second set of linked nodes arranged in a second form of decision logic. The first set of linked nodes can be converted to a first modified set of linked nodes arranged in a third form of decision logic. The second set of linked nodes can be converted to a second modified set of linked nodes arranged in the third form of decision logic. A color-coded visual representation of the first modified set of linked nodes and the second modified set of linked nodes can be provided to a user. Related apparatus, techniques, and articles are also described.

15 Claims, 15 Drawing Sheets

U.S. PATENT DOCUMENTS

| | | | |
|---|---|---|---|
| 5,682,487 | A | 10/1997 | Thomson |
| 5,692,107 | A | 11/1997 | Simoudis et al. |
| 5,696,885 | A | 12/1997 | Hekmatpour |
| 5,701,137 | A | 12/1997 | Kiernan et al. |
| 5,701,400 | A | 12/1997 | Amado |
| 5,710,896 | A | 1/1998 | Seidl |
| 5,720,007 | A | 2/1998 | Hekmatpour |
| 5,742,836 | A | 4/1998 | Turpin et al. |
| 5,745,712 | A | 4/1998 | Turpin et al. |
| 5,787,416 | A | 7/1998 | Tabb et al. |
| 5,796,932 | A | 8/1998 | Fox et al. |
| 5,806,056 | A | 9/1998 | Hekmatpour |
| 5,815,415 | A | 9/1998 | Bentley et al. |
| 5,818,155 | A | 10/1998 | Kawamura et al. |
| 5,822,745 | A | 10/1998 | Hekmatpour |
| 5,870,559 | A | 2/1999 | Leshem et al. |
| 5,870,768 | A | 2/1999 | Hekmatpour |
| 5,875,431 | A | 2/1999 | Heckman et al. |
| 5,890,131 | A | 3/1999 | Ebert et al. |
| 5,917,492 | A | 6/1999 | Bereiter et al. |
| 5,920,873 | A | 7/1999 | Van Huben et al. |
| 5,930,764 | A | 7/1999 | Melchione et al. |
| 5,953,017 | A | 9/1999 | Beach et al. |
| 5,953,707 | A | 9/1999 | Huang et al. |
| 5,958,008 | A | 9/1999 | Pogrebisky et al. |
| 5,966,126 | A | 10/1999 | Szabo |
| 5,966,695 | A | 10/1999 | Melchione et al. |
| 5,974,127 | A | 10/1999 | Wernli et al. |
| 5,982,370 | A | 11/1999 | Kamper |
| 5,987,242 | A | 11/1999 | Bentley et al. |
| 5,999,192 | A | 12/1999 | Selfridge et al. |
| 6,014,138 | A | 1/2000 | Cain et al. |
| 6,073,138 | A | 6/2000 | de l'Etraz et al. |
| 6,078,324 | A | 6/2000 | Phathayakorn et al. |
| 6,088,693 | A | 7/2000 | Van Huben et al. |
| 6,089,453 | A | 7/2000 | Kayser et al. |
| 6,094,654 | A | 7/2000 | Van Huben et al. |
| 6,108,004 | A | 8/2000 | Medl |
| 6,111,578 | A | 8/2000 | Tesler |
| 6,112,202 | A | 8/2000 | Kleinberg |
| 6,134,706 | A | 10/2000 | Carey et al. |
| 6,137,499 | A | 10/2000 | Tesler |
| 6,237,499 | B1 | 5/2001 | McKoy |
| 6,249,768 | B1 | 6/2001 | Tulskie, Jr. et al. |
| 6,259,451 | B1 | 7/2001 | Tesler |
| 6,285,366 | B1 | 9/2001 | Ng et al. |
| 6,292,830 | B1 | 9/2001 | Taylor et al. |
| 6,327,551 | B1 | 12/2001 | Peterson et al. |
| 6,396,488 | B1 | 5/2002 | Simmons et al. |
| 6,411,936 | B1 | 6/2002 | Sanders |
| 6,496,208 | B1 | 12/2002 | Bernhardt et al. |
| 6,609,098 | B1 | 8/2003 | DeMarcken |
| 6,646,652 | B2 | 11/2003 | Card et al. |
| 6,738,736 | B1 | 5/2004 | Bond |
| 6,897,885 | B1 | 5/2005 | Hao et al. |
| 7,171,407 | B2 | 1/2007 | Barton et al. |
| 7,171,618 | B2 | 1/2007 | Harrington et al. |
| 7,257,588 | B2 | 8/2007 | Keith, Jr. |
| 7,346,529 | B2 | 3/2008 | Flores |
| 7,831,526 | B1 * | 11/2010 | Crawford et al. ............... 706/11 |
| 2001/0049846 | A1 * | 12/2001 | Guzzi et al. ...................... 8/158 |
| 2002/0147626 | A1 | 10/2002 | Zagotta et al. |
| 2003/0069869 | A1 | 4/2003 | Gronau et al. |
| 2004/0039619 | A1 | 2/2004 | Zarb |
| 2004/0073442 | A1 | 4/2004 | Heyns et al. |
| 2004/0107131 | A1 | 6/2004 | Wilkerson et al. |
| 2004/0111255 | A1 | 6/2004 | Huerta et al. |
| 2004/0267785 | A1 * | 12/2004 | Suontausta et al. ........... 707/100 |
| 2006/0161560 | A1 * | 7/2006 | Khandelwal et al. ......... 707/100 |
| 2006/0173753 | A1 * | 8/2006 | Padmanabhan et al. ........ 705/27 |
| 2006/0188620 | A1 * | 8/2006 | Gutwein et al. .............. 426/433 |
| 2008/0147584 | A1 | 6/2008 | Buss |

FOREIGN PATENT DOCUMENTS

| | | |
|---|---|---|
| EP | 0717346 | 6/1996 |
| EP | 0770967 | 5/1997 |
| EP | 0978989 | 2/2000 |
| WO | 93/20510 | 10/1993 |
| WO | 95/12161 | 5/1995 |
| WO | 97/21171 | 6/1997 |

OTHER PUBLICATIONS

Sarkar et al. "Graphical Fisheye View of Graphs," ACM 1992.

Bederson et al. "Pad++: A Zoomable Graphical Interface for Exploring Alternative Interface Physics," ACM 1994.

Fekete et al. "Excentric Labling: Dynamic Neighborhood Labeling for Data Visualization," ACM 1999.

Hightower et al. "Graphical Multiscale Web Histories: A Study of PadPrint".

Bederson et al. "A Zooming Web Browser".

Noik "Layout-Independent Fisheye Views of Nested Graphs".

Clark, J., "Customizing Common Controls" Sep. 1997: Dr. Dobbs Journal.

Coffee, Peter "SPSS More Than a Pretty Face" Feb. 1996 PC Week.

Furnas, George W., "Generalized Fisheye Views" 1986 Human Factors in Computing Systems CHI '86 Conference Proceedings.

Lamping, et al. "A Focus+Context Technique Based on Hyperbolic Geometry for Visualization Hierarchies" Xerox Palo Alto Research Center.

Kohavi, "Bottom Up Induction of Oblivious Read-Once Decision Graphs" European Conference on Machine Learning 1994.

Friedman et al. "Finding the Optimal Variable Ordering for Binary Decision Diagrams" ICCC Transactions on Computers, vol. 39, No. 5 May 1990.

Covaliu, Zvi, "Decision Analysis: Concepts, Tools and Promise" Fair Isaac White Paper.

Efron & Tibshirani, *An Introduction to the Bootstrap* (1993).

B. Gaines, "Transforming Rules and Trees into Comprehensible Knowledge Structures", Advances in Knowledge Discovery and Data Mining, 1996.

\* cited by examiner

COLOR-CODED VISUAL COMPARISON OF DECISION LOGIC

REFERENCE TO RELATED APPLICATION

This application claims priority under 35 USC § 119 to Indian Patent Application No. 1847/DEL/2007, filed on Aug. 31, 2007, entitled: "Logical Comparison of Decision Trees", the contents of which are hereby incorporated by reference.

TECHNICAL FIELD

The subject matter described herein relates to the construction of decision logic with graphs and related user interfaces.

BACKGROUND

Strategies composed of nodes and links can represent various decision logic. Strategies can represent a series of decisions that divide a population into subsets. The decisions can be made on the basis of the values of one or more variables. Strategies can be used to assign a single course of action (which could be to take no action at all) to each population subset. One example of decision logic is described in the U.S. Pat. No. 7,000,199, incorporated by reference hereto in its entirety.

Strategies can be represented by decision tree, directed acyclic graph ("DAG") and exception-based directed acyclic graph ("EDAG") structures. Representations of strategies can have leaf nodes (sometimes referred to as "action nodes"), a root node (sometimes referred to as a "start node") and nodes that appear between the end nodes and the root nodes (sometimes referred to as "condition nodes" or "intermediate nodes" or "split nodes"). Depending on the type of a structure representing the decision logic, the root nodes, leaf nodes and intermediate nodes can be treated differently. For example, a root node can represent the beginning of an evaluation process, the intermediate nodes can represent evaluation conditions tested on one or more variables, and the leaf nodes can represent actions that should be taken if all of the evaluation steps corresponding to the condition nodes leading to these action nodes have been successfully resolved.

Decision trees can represent each of the decisions of the decision logic in a form of a branch. Decision trees can have one and only one root (or start) node. The decisions can be represented by two or more links (also referred to as "arcs") coming out of a single node. Each branch can correspond to a set of conditions or checks that can be configured such that only one condition is true in all cases. If a condition resolves to true, a link associated with this condition can be followed further. That link can lead to either an action node (i.e., leaf node), or to another condition node. All nodes within a decision tree can have one and only one parent node.

Condition nodes of some decision trees have either a single arc to an action node or two or more arcs to condition nodes. Some decision trees can have two arcs coming out of a single condition node and leading to two action nodes. For example, two arcs coming out of a single condition node can be used to assign two actions to the two subpopulations represented by those two conditions. In some decision trees, the start node can be directly connected to a single action node. In this case, there are no branches or condition nodes at all.

Decision trees can be used for the graphical representation of complex decision logic, involving evaluations of hundreds of variables, leading to hundreds of possible outcomes. Such decision trees can require a large number of nodes that can be difficult to display and analyze.

Strategies can also be represented by a "Directed Acyclic Graph", or DAG. A DAG structure has a set of nodes connected by links. The decision process starts at a single root node (also referred to as a "start node"). Some DAGs can have nodes that either have a single link to an action node, or two or more links to condition nodes. Each link can go towards a node that has links coming in from other nodes. Consequently, a node within a DAG structure can have more than one parent node. DAG structures do not allow links that introduce cycles in the graph. In some DAG structures, a condition node can have a single link to another condition node.

Generally, there are two kinds of DAG's: non-backtracking and backtracking. In non-backtracking DAG's, all nodes link to a single action node, or they link to 2 or more condition nodes where the conditions of those nodes are set up so that one of them must evaluate to true. In this way, every member of the population will eventually get assigned a single action without having to revisit an earlier node to explore additional possible paths to an action.

In a backtracking DAG, it is possible for condition nodes to link to a single condition node, or to link to multiple condition nodes where more than one of those conditions can evaluate to true. Backtracking DAGs allow backtracking to earlier nodes to explore other possible paths if a certain condition node does not evaluate to true. However, the conditions of the nodes must be set up so that there is a path to an action node for every possible case from the population.

For example, a DAG can be used to represent decision logic by associating each condition node to one of the decisions in the decision logic. If the condition at that node resolves to true, then the decision process can proceed down one of its arcs. The decision process will eventually reach an action node that identifies the action assigned to that subpopulation, or another condition node that represents the next decision. If the condition at a node is false, then the decision process backs up to one of the unexplored links coming out of a node that was previously visited. The node conditions and arcs of the DAG can be set up so that it is guaranteed that exactly one action node is reached in all circumstances. Some forms of DAG structures just have a start node with a link directly to an action node, without any condition nodes in between.

Strategies can also be represented by an Exception Directed Acyclic Graph ("EDAG"). An EDAG structure is a set of nodes connected by links. In EDAG structures, the decision process starts at a single root node called an Exception node. The Exception node represents the action to assign unless it is possible to assign some other action by following links to one of the action nodes. In some EDAG structures, each node can have only one link going out to an action node, one link going to another exception node, or one or more links going to condition nodes.

EDAG structures allow each link to go towards a node that has links coming in from other nodes. In other words, EDAG nodes can have more than one parent node. EDAG structures, just like DAG structures do not support links that introduce cycles in the graph.

An EDAG can represent decision logic, for example, by associating each condition node to one of the decisions in the decision logic. If the condition at that node resolves to true, then the decision process can proceed down one of its arcs. The decision process can either reach an action node that identifies the action assigned to that subpopulation, or it can reach another condition node that represents the next decision. If the condition at a node resolves to false, then the decision process follows one of the unexplored arcs coming out of a node that was previously visited. In some EDAG structures, the decision process may never reach an action node. In other words, EDAG structures can support subpopulations that are not expressly assigned to any particular action node. In that case, the action represented by the most recently visited exception node can be assigned to these subpopulations. One form of an EDAG structure can be represented by a single exception node.

Decision tree, DAG and EDAG structures can be leveled. A leveled decision tree can represent a structure in which all condition nodes aligned along a single column or row correspond to decisions checking the value of a single, identical variable. Similarly, a leveled DAG is a DAG (and a leveled EDAG is an EDAG) where all condition nodes correspond to decisions using the value of a single variable, and all the condition nodes corresponding to the same variable are aligned along a single column or row. In addition, the conditions on nodes, and links between nodes, can be set up so that no link goes between nodes in the same level, nor does a link go from a node in a lower level to a node in a higher level. In some DAG structures, the root node can appear in its own column or row, and all the action nodes can appear in their own column or row. In some EDAG structures, the Exception node can appear in its own column or row, and all the action nodes can appear in their own column or row.

The analysis and review of strategies can involve comparisons between two or more strategies representing various decision logic. Decision logic comparison can be useful in a variety of situations, including but not limited to understanding how two candidate strategies in development are different, understanding how a challenger strategy (i.e., a proposed strategy) is different from a champion strategy (i.e., an accepted strategy), understanding the revisions made to a strategy over time, understanding the differences between two strategies that use different leveling of variables.

SUMMARY

Techniques are described for logically comparing strategies. In one aspect the strategies can be compared by receiving a request to compare a first strategy to a second strategy, the first strategy graphically represented by a first set of linked nodes arranged in a first form of decision logic, the second strategy graphically represented by a second set of linked nodes arranged in a second form of decision logic. The first set of linked nodes can be converted to a logically equivalent first modified set of linked nodes arranged in a third form of decision logic. The second set of linked nodes can be converted to a logically equivalent second modified set of linked nodes arranged in the third form of decision logic. A visual representation of the first modified set of linked nodes and the second modified set of linked nodes can be displayed to a user.

In one variation, the third form of decision logic can be selected from the group consisting of a decision tree, directed acyclic graph and an exception-based directed acyclic graph. The third form of decision logic can be leveled. It can also be read-once. The visual representation can be color-coded to indicate the differences and similarities between the first modified set of linked nodes and the second modified set of linked nodes.

In another interrelated aspect, comparison of strategies can be implemented by receiving a request to compare a first strategy to a second strategy from a user, a first action graph can be generated corresponding to a first action node within the first strategy, a second action graph can be generated corresponding to a second action node within the second strategy. A visual representation of the first action graph and the second action graph can be simultaneously displayed.

For example, the first action node and the second action node can be selected by the user. The first action node and the second action node can correspond to the same action. The visual representation can be color-coded to indicate the differences and similarities between the compared action graphs. In some variations, the first action graph and the second action graph can be leveled action graphs. The first action graph and the second action graph can be read-once action graphs.

In another interrelated aspect, comparison of strategies can be implemented by identifying a first segment corresponding to a first action selected from the first strategy and a second segment corresponding to a second action selected from the second strategy. An intersection segment corresponding to the intersection of the first segment and the second segment can be generated. Using the intersection segment, a cross pair graph can be generated and rendered, for example, to the user.

In some variations the cross pair graph can be leveled. The cross pair graph can also be read-once. The first action and the second action can be selected from a crosstabulation table. The cross pair graph can be generated for each combination of the first action and the second action selected from the crosstabulation table.

In another interrelated aspect, comparison of decision trees can be implemented by receiving a first tree and a second tree, each tree comprising at least one leaf node, the at least one leaf node assigning a population subset to an action. For each leaf node of the first tree and its corresponding population subset, a sub-tree can be generated representing a logical treatment of the corresponding population subset by the second tree. A diff tree can be constructed by attaching a corresponding sub-tree to each leaf node of the first tree. The rendering of the diff tree can be initiated. In some variations, the diff tree can be color coded.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DETAILED DESCRIPTION

The strategies can be compared in response to a request received from a user. The first strategy can be graphically represented by a first set of linked nodes arranged in a first form of decision logic. The second strategy can be graphically represented by a second set of linked nodes arranged in a second form of decision logic. The first set of linked nodes can be converted to a first modified set of linked nodes arranged in a third form of decision logic. The second set of linked nodes can be converted to a second modified set of linked nodes arranged in the third form of decision logic. A visual representation of the first modified set of linked nodes and the second modified set of linked nodes can be provided to a user. Related apparatus, techniques, and articles are also described.

Figure 1:
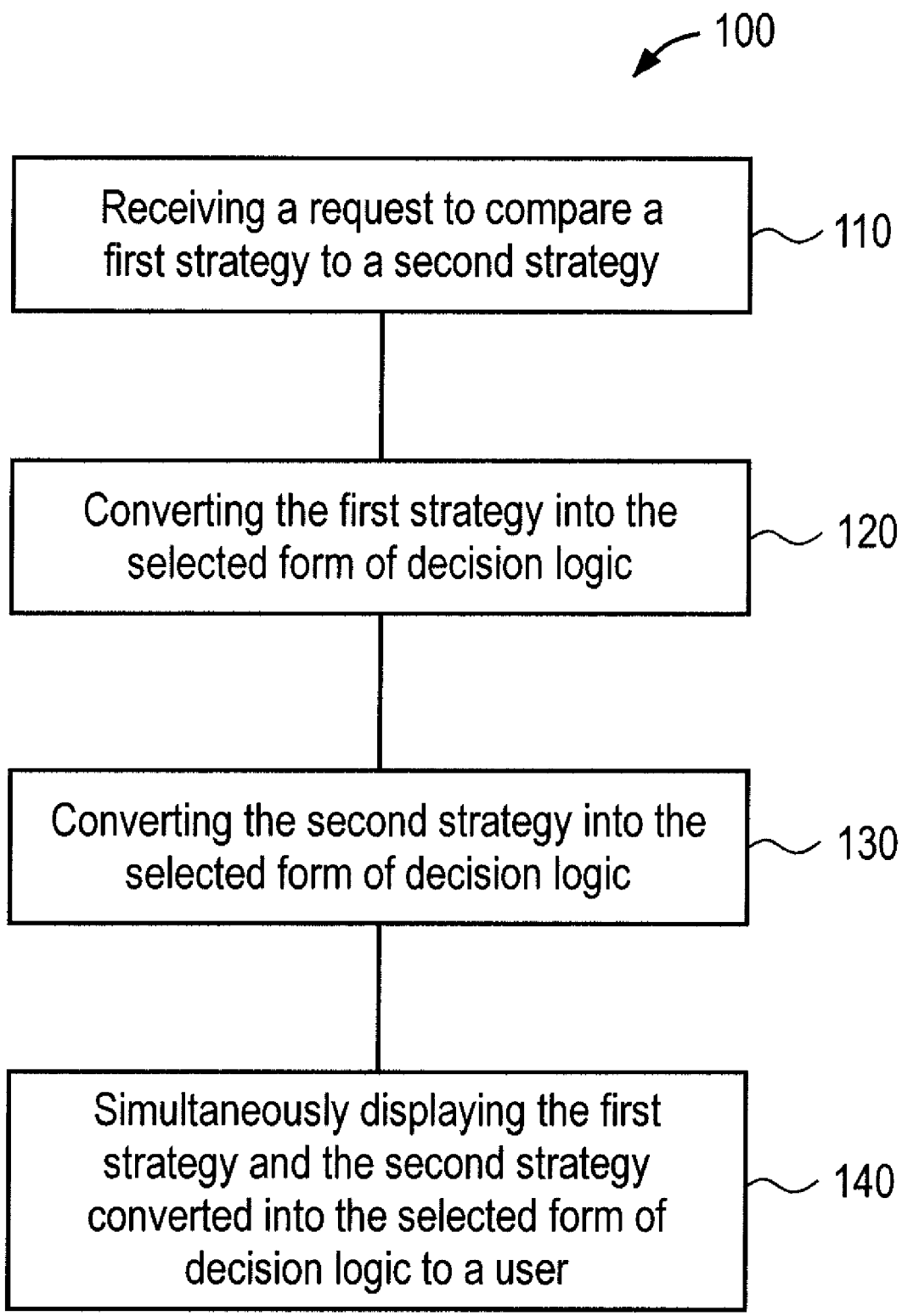
FIG. 1 is a process flow diagram illustrating a method for comparing strategies.

FIG. 1 illustrates a method 100, in which, at 110, a request to compare a first strategy to a second strategy is received. The request can be generated by a user interface as a result of a user action. The request can also be generated by using application programming interfaces (APIs). At 120, the first strategy can be converted into a selected form of decision logic. For example, the selected form of decision logic can be selected by a user. The selected form of decision logic can also be configured by an administrator and/or a manufacturer. In some implementations, the selected form of decision logic can be a directed acyclic graph. In another implementation the selected form of decision logic can be an exception based directed acyclic graph. The selected form of decision logic can also be a decision tree. The first strategy can be converted into read-once, leveled, directed acyclic graphs or exception based directed acyclic graphs.

At 130, the second strategy can also be converted into the same form of decision logic selected for the conversion of the first strategy. At 140, the resulted converted strategies can simultaneously be displayed to a user, for example, for visual comparison purposes. The user can be a human being or another application that can initiate a request for comparing of the strategies with the help of application programming interfaces.

Figure 2:
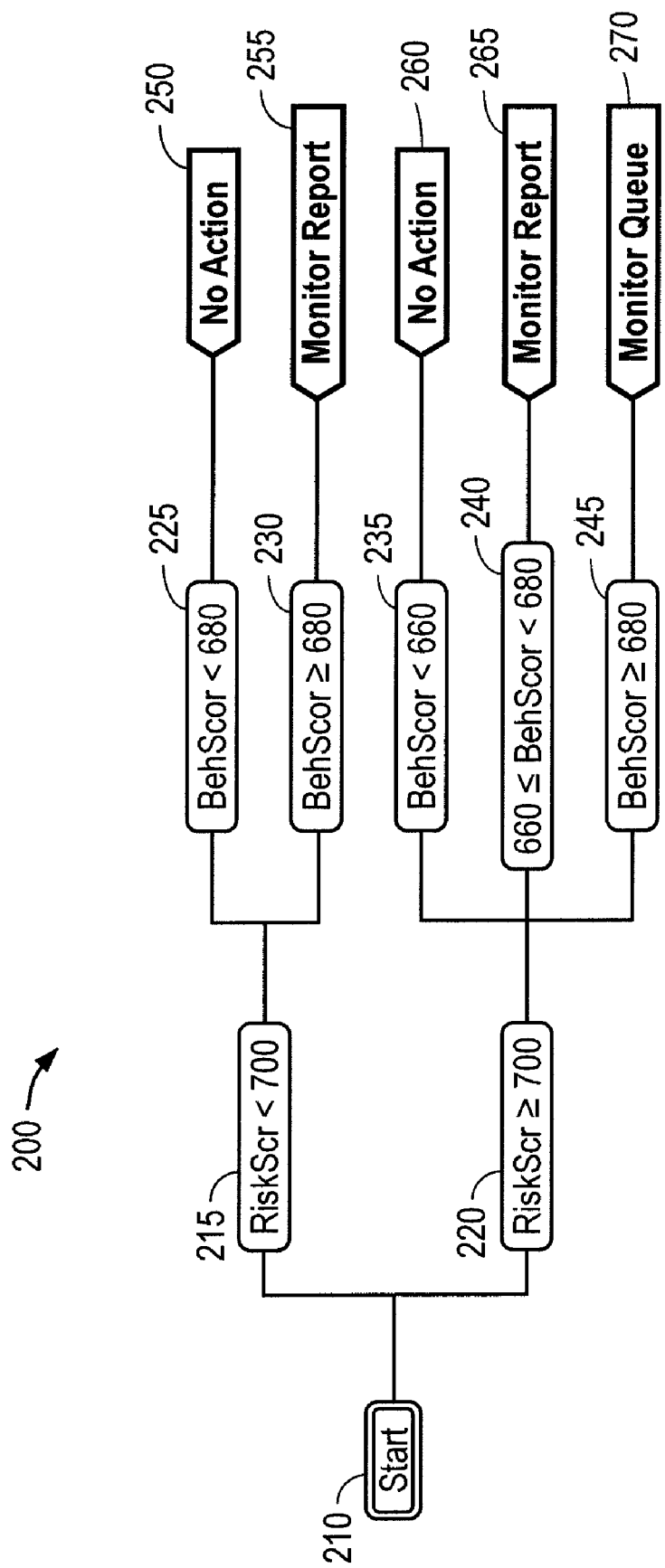
FIG. 2 is a diagram illustrating a strategy represented as a decision tree.

FIG. 2 provides a diagram of one variation of a decision tree 200. In this variation, the structure of the decision tree 200 has one root node 210. The decision tree 200 also has seven condition nodes 215-245. The decision tree 200 also has five action nodes 250-270.

Each one of the condition nodes 215-245 represents a condition that can be tested on one or more variables. For example, the condition node 215, can be associated with evaluation of an "RiskScr" variable. In one implementation, the condition node 215 can test if the value of the "RiskScr" variable is less than 700. If this condition is true, the decision process can evaluate conditions associated with condition nodes 225 and 230. If the RiskScr variable is greater than or equal to 700, then the condition node 220 will evaluate to true and the progress will be made to the three condition nodes 235-245. Some conditions can consist of a set of logical conditions, one of which must be true at any time, along with a mapping of each logical condition to one of the node's children links.

Similarly, condition nodes 225-245 test the value of the "BehS.cor" variable. For example, if the BehScor variable is less than 680, the condition associated with the node 225 will evaluate to true. As a result a decision process will proceed to the action node 250. In one implementation the action node 250 can be associated with a "No Action" command.

Each one of the five action nodes 250-270 can represent one or more actions that should be taken according to the decision tree 200. In some variations an action can also represent a logical conclusion. In other variations, an action can represent a command to perform with one or more instructions. For example, an action node may request execution of another decision tree.

Figure 3:
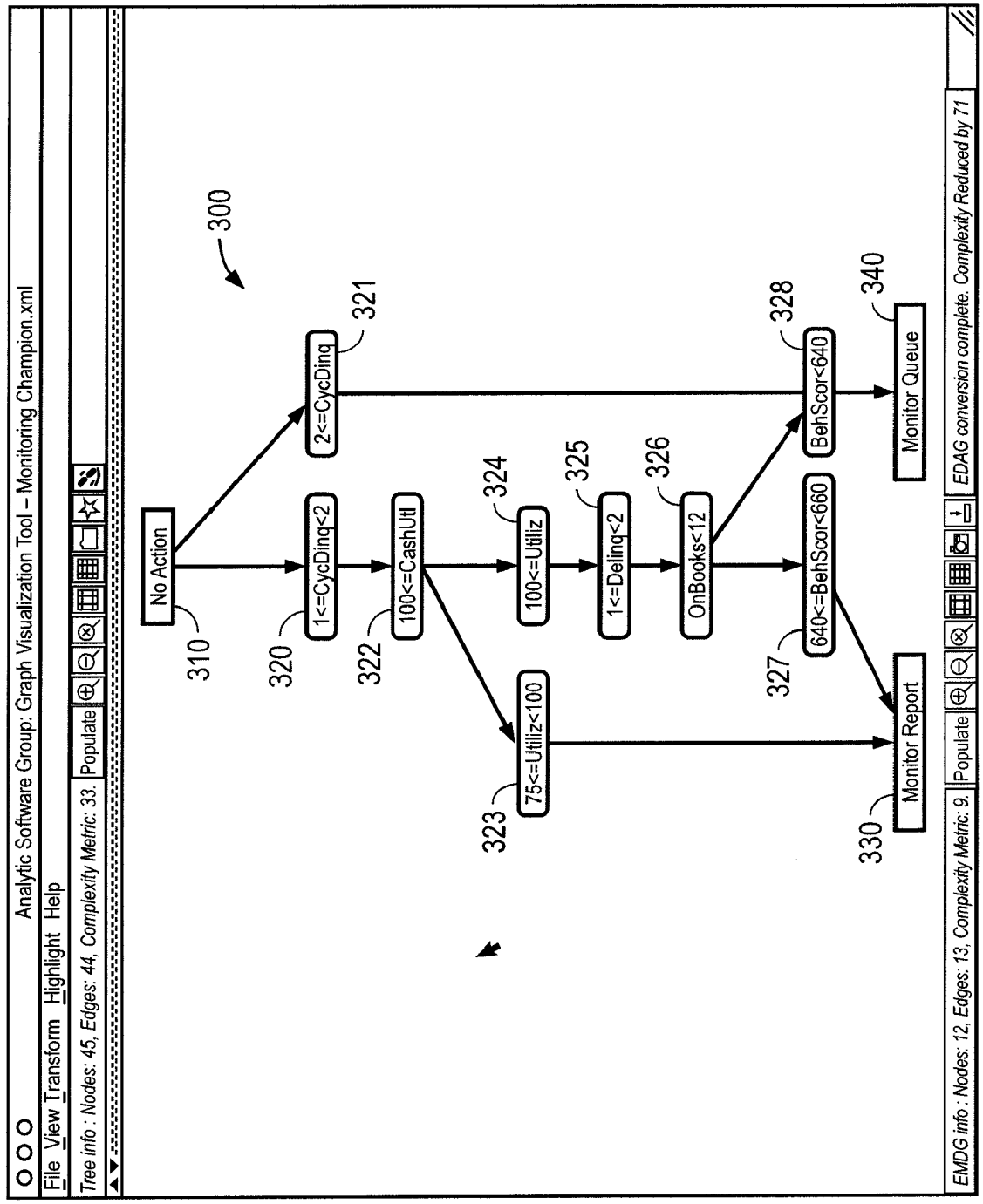
FIG. 3 is a diagram illustrating a strategy represented as an EDAG structure.
Figure 4A:
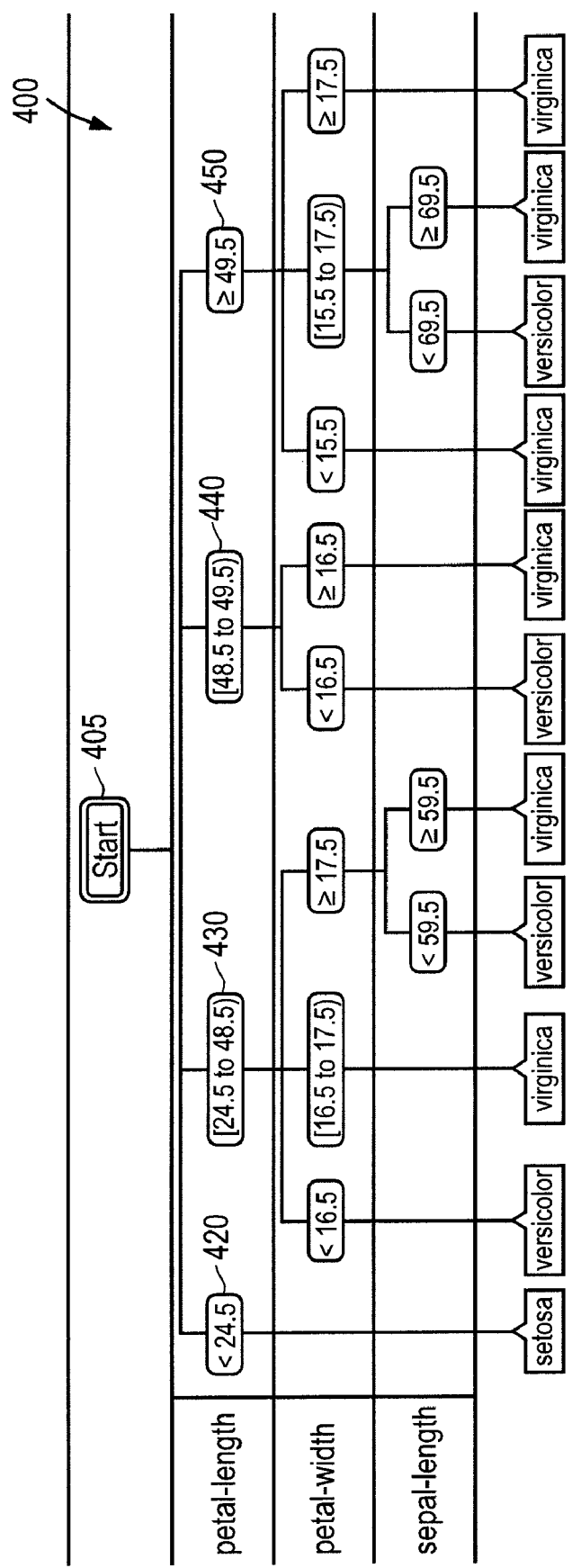
FIGS. 4A-4D are diagrams illustrating two decision trees that are structurally different but are logically equivalent.
Figure 4B:
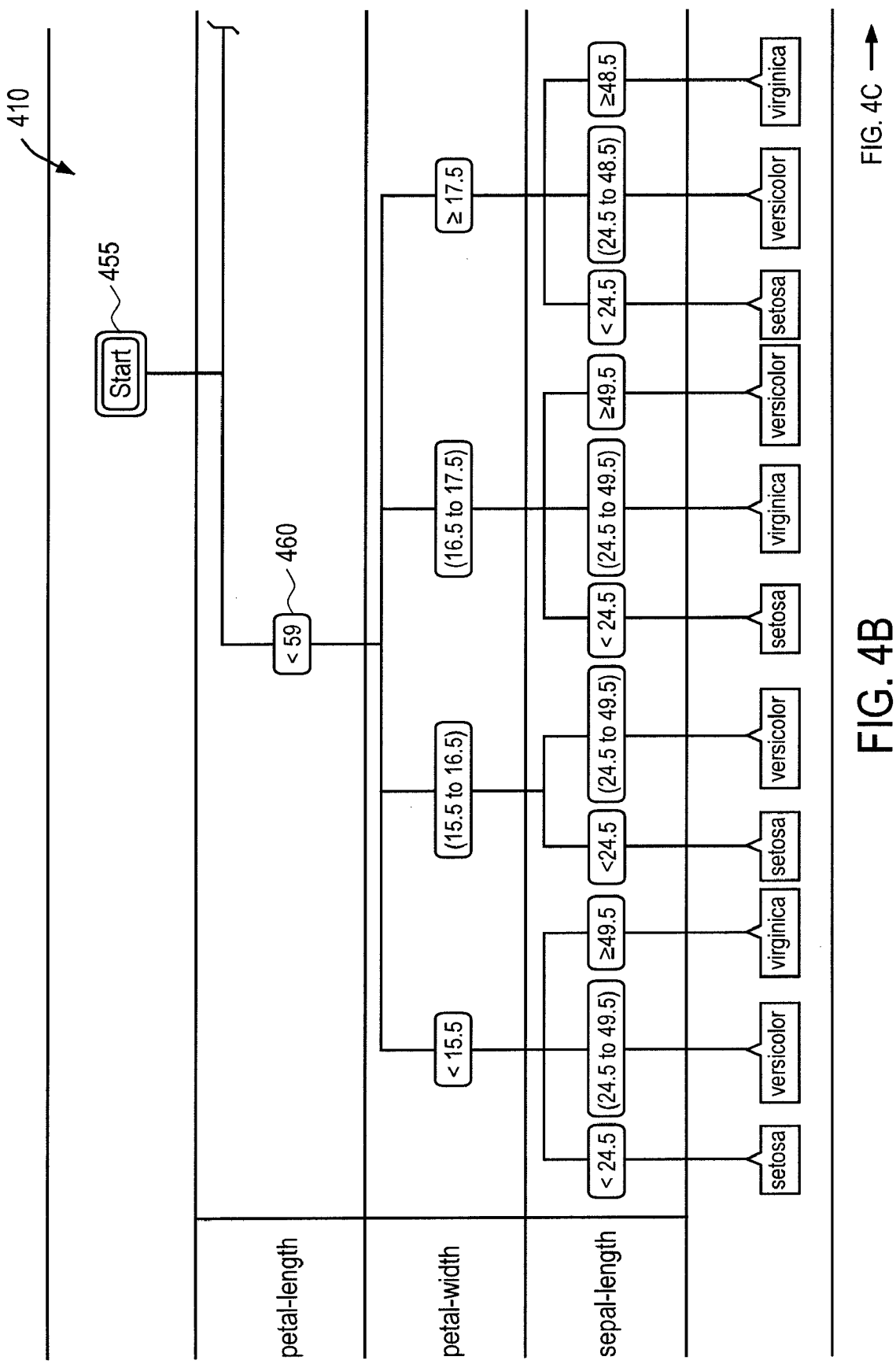
Figure 4C:
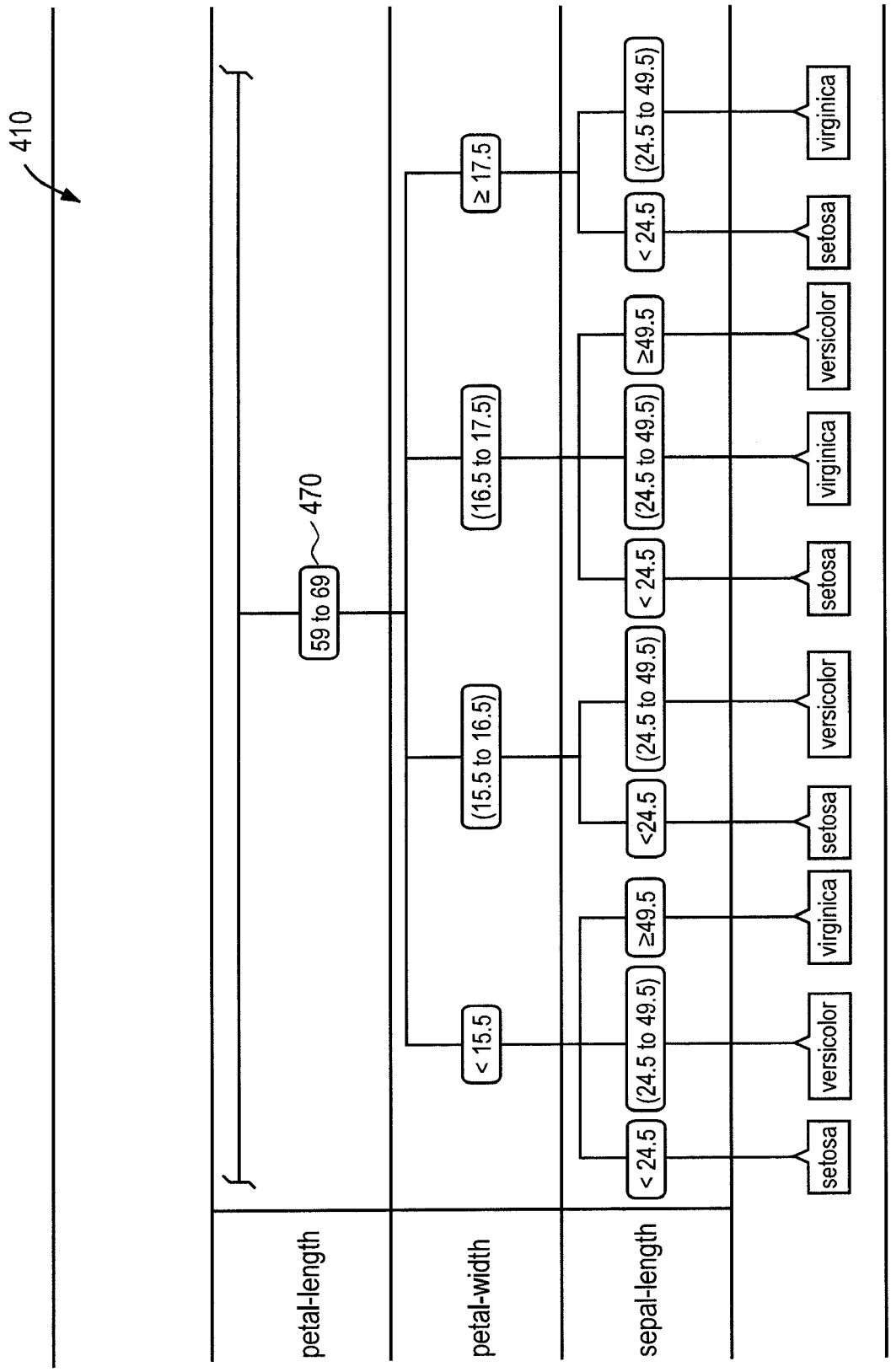
Figure 4D:
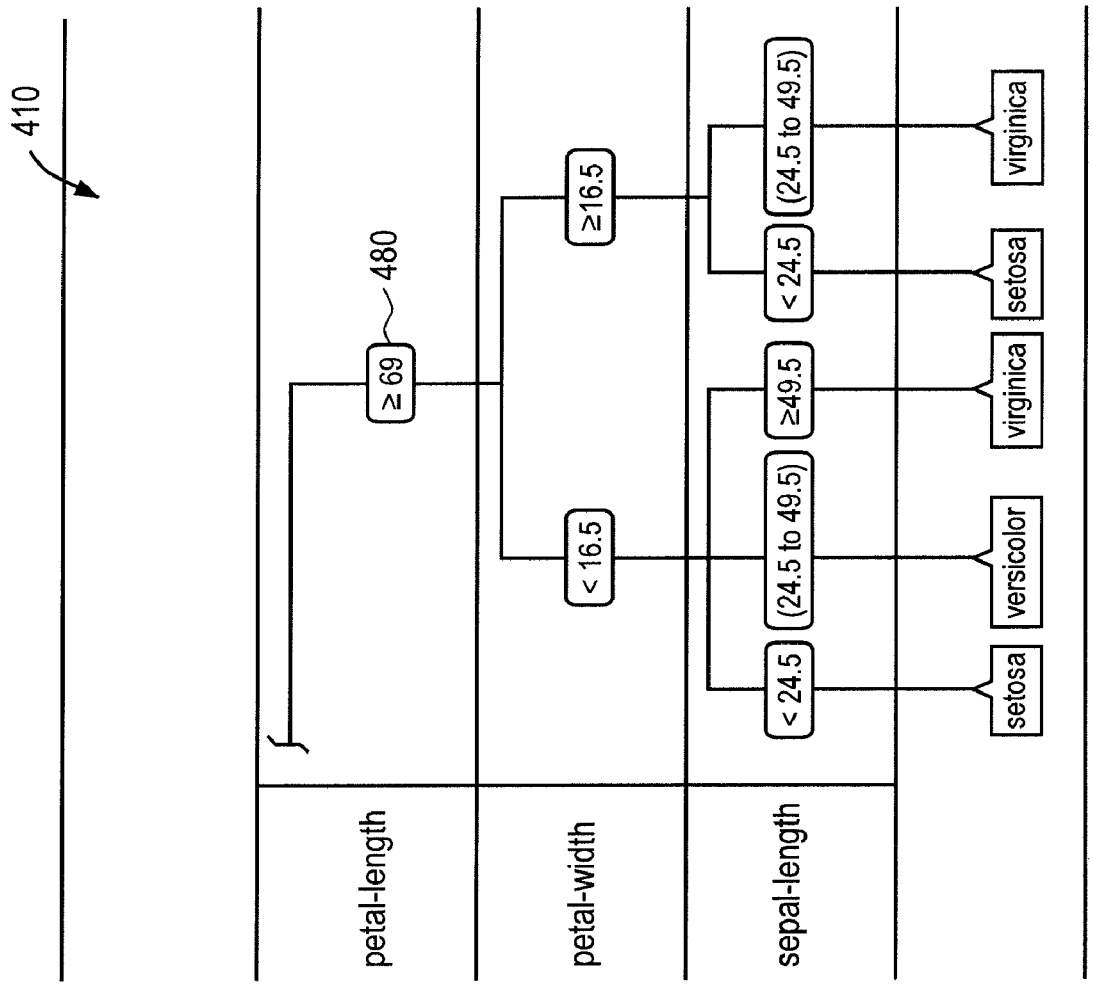

FIG. 3 provides another representation of decision tree 200. The logic structure labeled 300 can also be referred to as an exception-based directed acyclic graph ("EDAG"). EDAGs are node and link structures that can represent decision logic. For example, Gaines, "Transforming Rules and Trees into Comprehensible Knowledge Structures", *Knowledge Discovery in Databases II*. AAAI/MIT Press 1995, incorporated hereto by reference in its entirety, describes several features of EDAGs including:

All paths through the graph are traced from each of its root nodes

For each node on a path, if the premise (if any) is TRUE then the conclusion (if any) is noted for that path, replacing any previous conclusion noted for the path.

A path is traced until a premise fails to hold, or an action node is reached.

When a path has been traced, any conclusion noted is asserted.

In the example of the FIG. 3, the EDAG 300 can be resolved to three possible conclusions:
1. No Action;
2. Monitor Report;
3. Monitor Queue.

The root node 310 can be associated with the "No Action" conclusion. The EDAG 300 can resolve to the "No Action" conclusion if the intermediate condition nodes prevent the EDAG 300 from resolving to any other conclusion. The action node 330 can be associated with the "Monitor Report" conclusion. The "Monitor Report" conclusion can be reached if condition nodes 320, 322, 323 resolve to TRUE. The "Monitor Report" conclusion can also be reached if condition nodes 320, 322, 324, 325, 326 and 327 resolve to TRUE. Similarly, the "Monitor Queue" conclusion can be reached if the condition nodes 321, and 328 resolve to TRUE. The "Monitor Queue" conclusion can also be reached if the condition nodes 320, 322, 324, 325, 326 and 328 resolve to TRUE.

The condition nodes 320-328 can be resolved either to TRUE or to FALSE. Each condition node can be resolved to true if the condition associated with the node is satisfied. For example, the condition node 321 is associated with the condition 2<=CycDInq. Consequently, if the value of the CycDInq variable is greater than or equal to 2, the condition node 321 will resolve to TRUE. If the value of the CycDInq variable is less than 2, the condition node 321 will resolve to FALSE.

The EDAG 300 can test the values of six different variables. Specifically, the nodes 320 and 321 can test the value of the "CycDInq" variable. The node 322 can test the value of the CashUtl variable. The nodes 323 and 324 can test the value of the Utiliz variable. The node 325 can test the value of the Delinq variable. The node 326 can test the value of the OnBooks variable. The nodes 327 and 328 can test the value of the BehScor variable.

Strategies can be compared behaviorally and/or structurally. The behavioral comparison of strategies can involve determining how the strategies treat segments of a population differently. In some implementations, a behavioral comparison can describe the similarities and differences in actions assigned to different population segments. For example, one segment might receive "Action 1" according to the champion strategy but "Action 2" according to the challenger strategy.

When two strategies are represented with decision trees, the structural comparison can describe the differences in levels, branches, and leaves. For example, two strategies can be structurally different but behaviorally equivalent. In some implementations, just changing the leveling of variables used in a strategy while keeping the strategy logically equivalent, can lead to a tree that appears to be very different in its set of branches, yet still assigns the exact same actions to all sub-populations as does the original strategy.

The behavioral and structural comparisons can be useful in different contexts. The behavioral comparison can be useful in a context of structurally different but behaviorally similar strategies. The structural comparisons can be useful for determining the differences in the context of a particular structure. For example, the behavioral comparison can provide a useful insight that "customers with high credit limits get action 1 in decision tree 1 and action 2 in decision tree 2." The structural comparison can be used to identify the differences in structure (i.e. levels, branches and leaves) that lead different customers to different actions. In some implementations, the structural comparison can also be helpful for incorporating some aspects of one decision tree into another.

Behavioral comparison of strategies can be done by converting the compared strategies into leveled, read-once DAG (Directed Acyclic Graph) or EDAG (Exception-based Directed Acyclic Graph) structures. EDAG structures generally have smaller number of nodes than regular decision trees. Consequently, it may be beneficial to transform a decision tree into an EDAG structure for visualization purposes.

The mechanics of DAG and EDAG structures as well as the conversion techniques are described in the U.S. Pat. No. Ser. No. 11/845,291, filed Aug. 27, 2007, the contents of which are hereby fully incorporated by reference.

In some implementations, the strategies can be transformed into leveled EDAG structures. Leveled strategies (e.g. leveled DAGs or leveled EDAGs) can be structures where the variables appearing on each level remain the same. In other words, each node appearing on a specific level can use the same variables as any other node appearing on that level. FIG. 3 illustrates one implementation of the leveled EDAG structure 300. This structure can be leveled because the variables on each level remain the same. For example, the second level of the EDAG illustrates the condition nodes 320 and 321. Both of these nodes can test the values of the CycDlnq variable. Similarly, on the fourth level, both condition nodes 323 and 324 test values of the same Utiliz variable.

In this implementation, each condition node in the leveled EDAG structure 300 can test the value of only one variable. Other implementations are possible, in which condition nodes can test the values of several variables. In that case, the decision tree can be leveled, if each node appearing on the same level can test the values of the same collection of variables.

Read-once strategies (e.g. read-once DAGs or read-once EDAGs) can be structures where variables that do not appear more than once within a single path. For example, FIG. 3 illustrates a read-once EDAG structure 300. This structure can be read-once because the variables along each path do not repeat. Specifically, the left most path of the EDAG 300 contains nodes 310, 320, 322, 323 and 330. The action nodes 310 and 330 are associated with actions, each of which appear exactly once along this path. The condition nodes 320, 322 and 323 are each associated with variables that also appear exactly once along this path.

In some aspects, converting the strategies into logically equivalent, leveled read-once DAG or EDAG structures can be helpful for removing the structural differences while leaving the behavioral differences intact. Two strategies can be behaviorally identical but structurally different, for example, when they use a different leveling of the variables. Transforming these strategies into logically equivalent DAG structures with the same level ordering puts them on a "common ground" and simplifies identification of the behavioral differences between the compared strategies.

For example, FIGS. 4A-D illustrates two structurally different decision trees 400 and 410. The decision tree 400 illustrates the root node 405 connected to four condition nodes 420, 430, 440 and 450. The decision tree 410 illustrates the root node 455 connected to three condition nodes 460, 470 and 480. Since the number of condition nodes connected to the root nodes 405 and 455 are different, it can be inferred that the decision trees 400 and 410 are not structurally the same.

Figure 5:
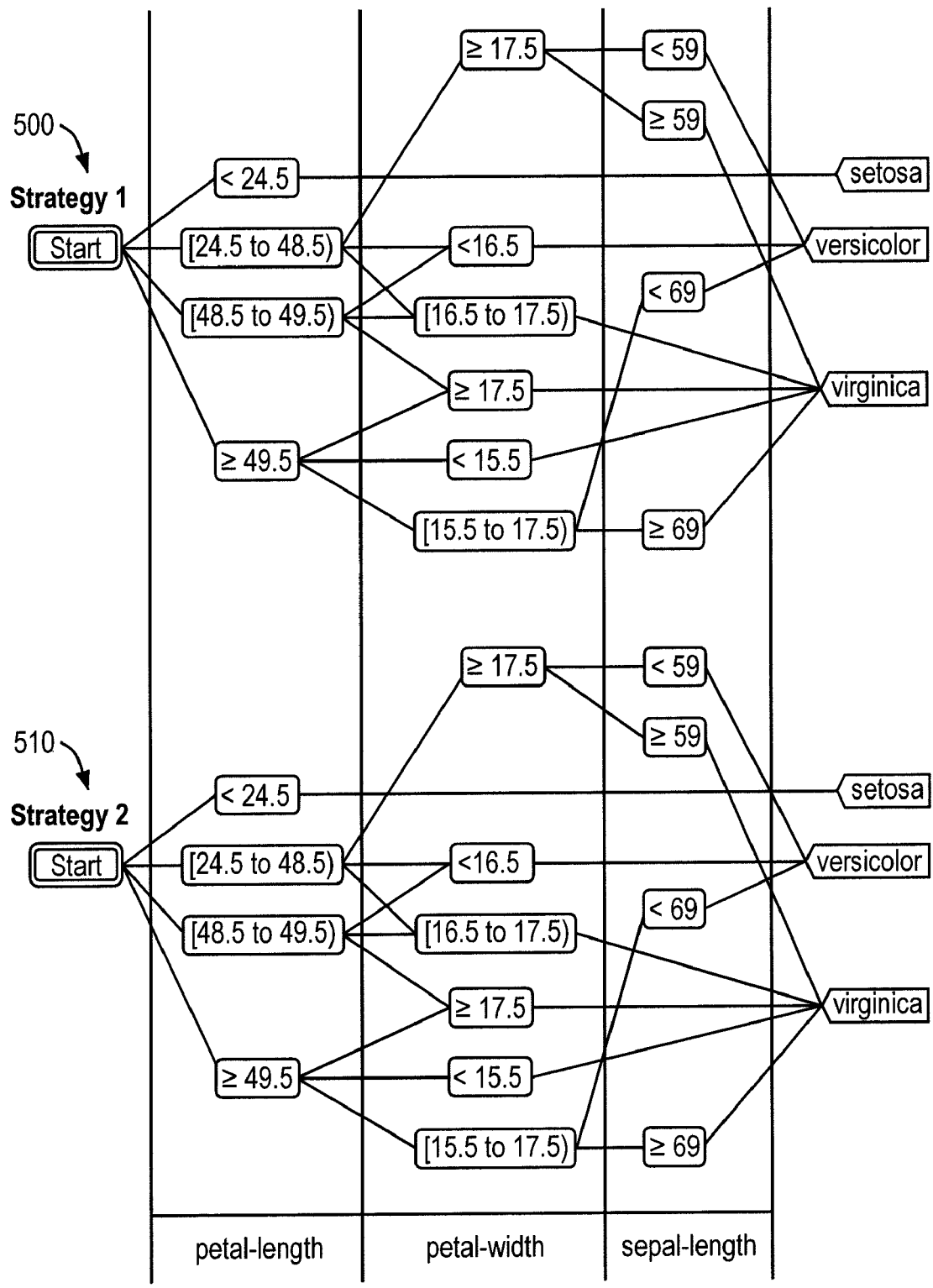
FIG. 5 is a diagram illustrating a comparison of the decision trees of FIG. 4 after converting them to Exception-based Directed Acyclic Graphs with the same leveling.

Converting the decision trees 400 and 410 to the leveled read-once EDAG structures can help determining whether the decision trees are behaviorally different. It can further be helpful to display the converted structures next to each other. For example, FIG. 5 can illustrate the EDAG structure 500 that is logically equivalent to the decision tree 400. FIG. 5 also illustrates the EDAG structure 510 that is logically equivalent to the decision tree 410. The EDAG structures 500 and 510 can be displayed side by side to simplify the identification of the behavioral differences. In this example, it is apparent that the two strategies are behaviorally equivalent because DAG 500 is equal to DAG 510.

In some implementations, to simplify the comparison process, the compared decision trees and/or EDAGs can be presented side-by-side. In other implementations the levels of the compared decision trees can also be aligned to simplify the comparison of conditions used by the level's nodes. Further, the condition nodes that are considered similar can be rendered in the same color. In some implementations, the condition nodes that are considered different can be rendered in different colors.

Some implementations can use the visualization techniques discussed in a co-pending patent application entitled "Visualization of Decision Trees", the contents of which is hereby fully incorporated by reference, to highlight the logical paths that differ between the two graphs. For example, all nodes that are in a path that differs between the two graphs could be rendered in full with a label, while all other nodes can be rendered in a shrunken form.

In another implementation, the strategies can be compared by comparing corresponding action graphs derived from these strategies. An action graph can be a set of nodes connected by links. An action graph can visually describe the population subset that is assigned a particular action by the strategy. In some implementations, an action graph can have a single root node (or start node) and a single action node. Each node of the action graph can have either a single link going towards the action node, or one or more links going towards condition nodes. Each link can go towards a node that has links coming in from other nodes. In other words, nodes can have more than one parent node. Generally, action graphs may not support links that introduces cycles in the graph.

An action graph can represent a decision process to determine whether to assign the action represented by the action graph or not. For example, each condition node can correspond to one of the decisions in the decision logic. Beginning at the start node, each link can be followed to either an action node or a condition node. If a condition node is reached and the condition at that node is true, then one of the arcs associated with the condition node can be followed further down the hierarchy. If a condition node is reached and the condition at the node is false, then other links from previously visited nodes can be followed. If the action node is reached, then the action represented by this action graph can be assigned. If an action graph does not provide any paths to the action node such that all conditions associated with the condition nodes on that path are true, the action represented by this action graph is not assigned.

Figure 6:
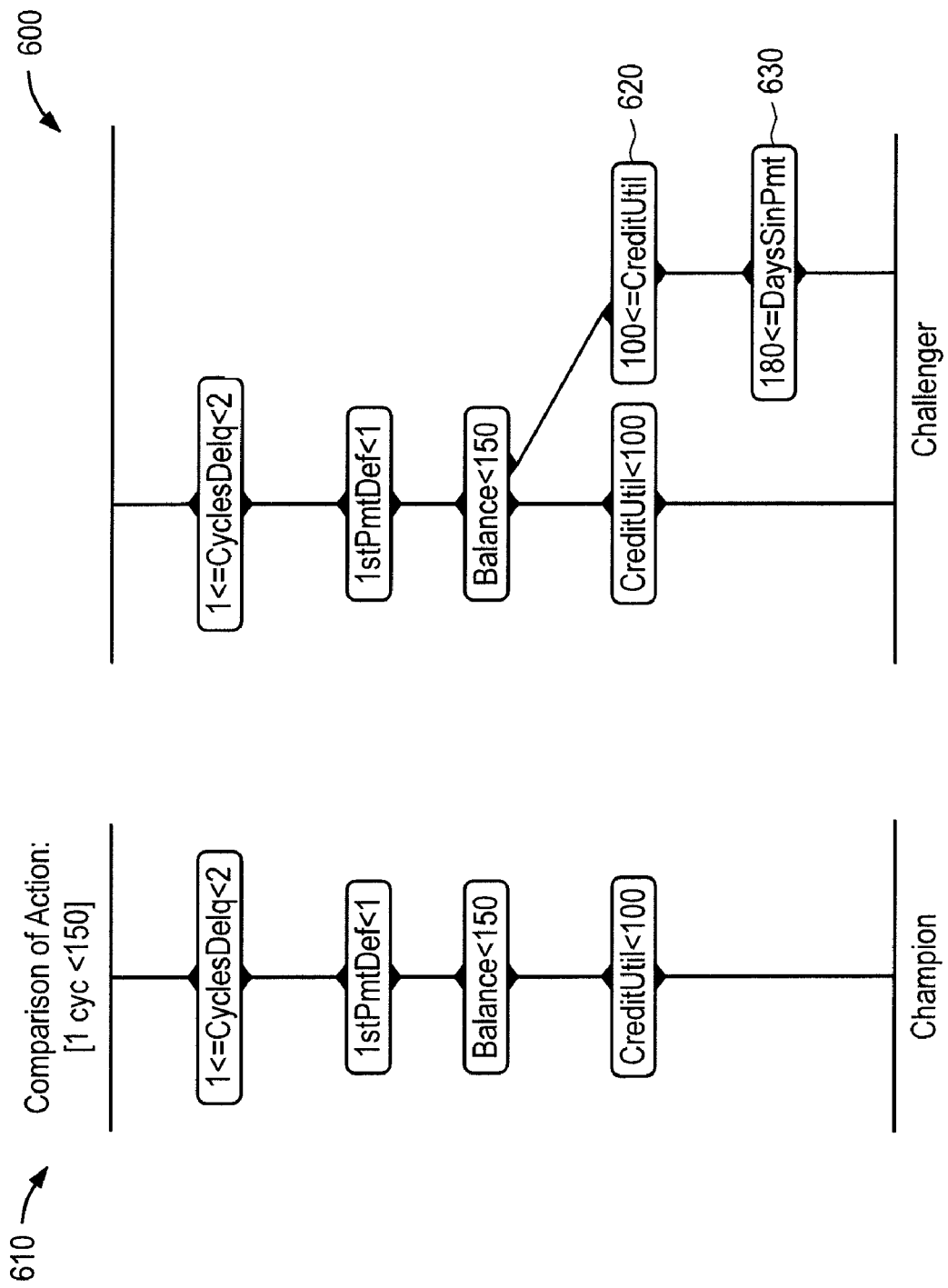
FIG. 6 is a diagram illustrating a comparison of action graphs for the action "1 cyc <150" in Champion and Challenger strategies.

FIG. 6 illustrates an action graph from a champion strategy, action graph 610, being compared to an action graph from a challenger strategy, action graph 600. In this example, both action graphs were generated for the action "1 cyc >150." Based on this comparison, it can be determined that the action graph 600 is different from the action graph 610 because the action graph 600 has nodes 620 and 630 that are not present in the action graph 610. This means the subpopulations receiving the action "1 cyc >150" from the two strategies are different.

In one implementation, action graphs 600 and 610 can be leveled to simplify their comparison. In another implementation, the action graphs can use any leveling that simplifies the comparison process. In some implementations, the algorithm that determines the simplest leveling of the two Action graphs being compared can arrange the leveling of these graphs to match each other. In other implementations, the leveling of the compared graphs may not be necessary. In some implementations, the user can choose a custom ordering of levels used by both action graphs or choose an optimally determined ordering of levels that minimizes the number of nodes in one of the action graphs or in both action graphs.

Figure 7:
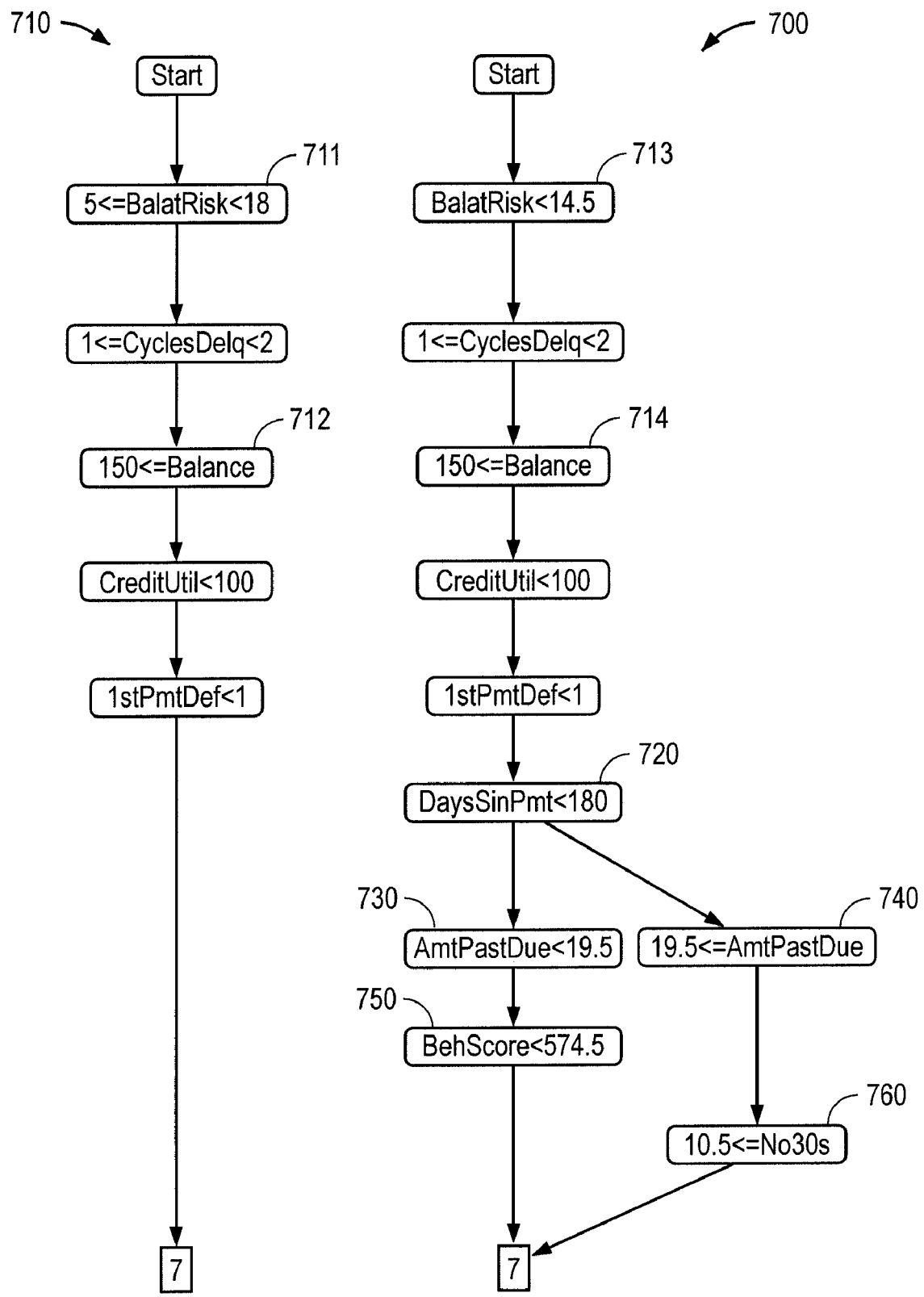
FIG. 7 is a diagram illustrating a comparison of action graphs for the action "7" in Champion and Challenger strategies.

FIG. 7 illustrates another example of action graph comparison. Specifically, FIG. 7 illustrates the action graph 710 presented side-by-side with the action graph 700. When the two action graphs are presented side-by-side, the comparison of the two graphs can be simplified in many ways. For example, all the levels in the two action graphs can be drawn on the same horizontal "row" to aid the comparison of conditions in each level across the graphs. In some implementations, color-coding can provide visual cues of when the conditions within a level are equivalent across the action graphs or when they are different. For example, the nodes 712 and 714 associated with the condition "150<=Balance" appear on the same level in the action graph 710 and the action graph 700. In some implementations, nodes associated with identical conditions appearing on the same level in compared graphs can both be shaded with the same color (e.g., gray). Similarly, the nodes appearing on the same level but associated with different conditions can be shaded with different colors, as illustrated for nodes 711 and 713. In some implementations, additional nodes can also be color-coded to illustrate the differences between the compared action graphs. For example, the nodes 720-760 displayed in the graph 700 are not present in the graph 710. These nodes can be color coded to illustrate the differences between the compared action graphs.

In yet another implementation, strategies can be compared by generating multiple cross pair graphs. Each cross pair graph can describe the subpopulation receiving an ordered pair of actions from the two strategies being compared, where the first element of the ordered pair is an action assigned by the first strategy, and the second element of the ordered pair is an action assigned by the second strategy. For example, a cross pair graph can display the logic getting assigned action #1 in the first decision tree and action #2 in the second decision tree.

In some aspects, each pair of actions from the two strategies can be compared to determine the intersection of those segments that get the first action of the pair in the first strategy but would get the second action of the pair in the second strategy. The intersection, which is a logical expression, can further be rendered as a single cross pair graph.

For example, a champion strategy can be compared to a challenger strategy. If both strategies assign actions: "Action A", "Action B" and "Action C," then comparing these two strategies can generate nine cross pair graphs, as presented in the crosstabulation table below:

TABLE 1

| Champion | Challenger | What is represented by the action graph in this cell of the crosstabulation: |
|---|---|---|
| Action A | Action A | Intersection of segments assigned Action A in the champion strategy and Action A in challenger strategy |
| Action A | Action B | Intersection of segments assigned Action A in the champion strategy and Action B in challenger strategy |
| Action A | Action C | Intersection of segments assigned Action A in the champion strategy and Action C in challenger strategy |
| Action B | Action A | Intersection of segments assigned Action B in the champion strategy and Action A in challenger strategy |
| Action B | Action B | Intersection of segments assigned Action B in the champion strategy and Action B in challenger strategy |
| Action B | Action C | Intersection of segments assigned Action B in the champion strategy and Action C in challenger strategy |
| Action C | Action A | Intersection of segments assigned Action C in the champion strategy and Action A in challenger strategy |
| Action C | Action B | Intersection of segments assigned Action C in the champion strategy and Action B in challenger strategy |
| Action C | Action C | Intersection of segments assigned Action C in the champion strategy and Action C in challenger strategy |

Figure 8:
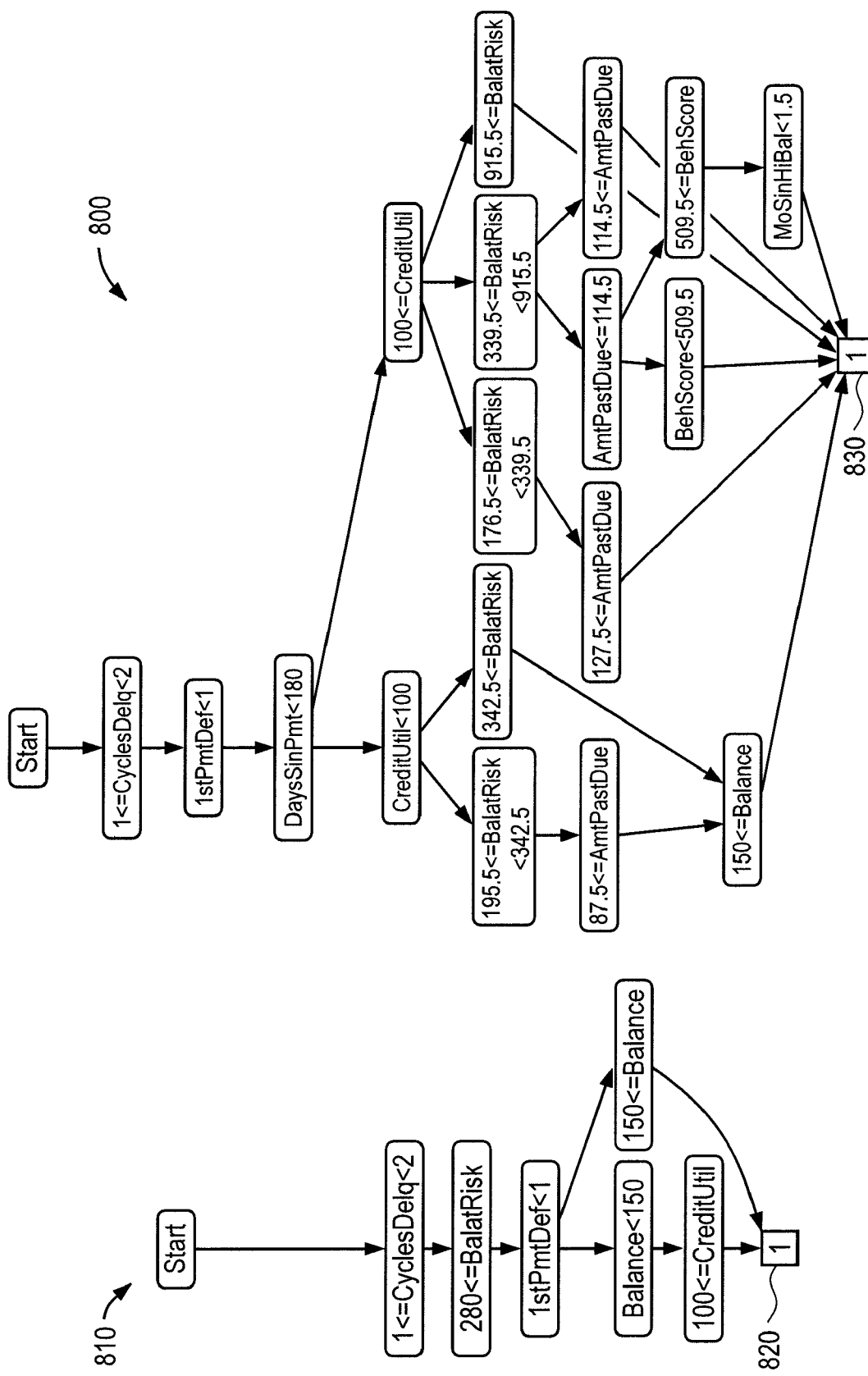
FIG. 8 is a diagram illustrating, on the left, the action graph for action "1" in a Champion strategy, and on the right, the action graph for action "1" in a Challenger strategy.

For example, FIG. 8 can illustrate the action graph 800 generated for action "1", depicted by action node 830, for a challenger strategy. FIG. 8 can also illustrate the action graph 810 generated for action "1", depicted by action node 820, for a champion strategy. In some implementations, the actions 820 and 830 can be identical. In other implementations, the actions 820 and 830 can be associated with different physical acts.

Figure 9:
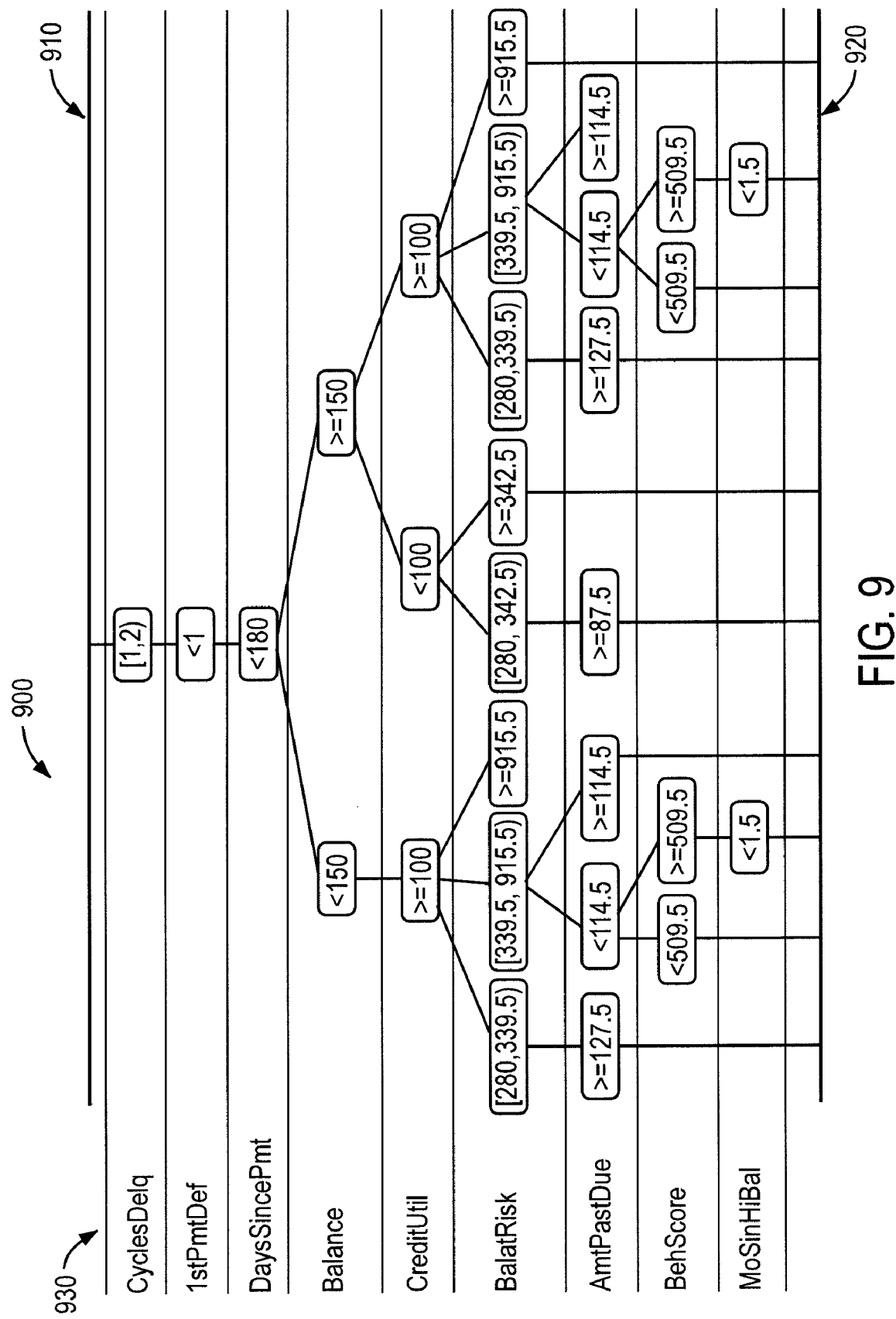
FIG. 9 is a diagram illustrating a cross pair graph describing every entity that is assigned action "1" in both the Champion and the Challenger strategies.

The challenger strategy can be compared to the champion strategy, for example, by identifying the similarities within the segments that lead to the action node 820 in the action graph 810 and the action node 830 in the action graph 800. The similarities between the action graphs 800 and 810 can be visualized as the cross pair graph 900 illustrated in the FIG. 9. In some implementations, the cross pair graph 900 can provide a graphical representation of all logic assigned action "1" by both the champion and challenger strategies. In other words, cross pair graph 900 represents all decision paths that lead to action node 820 in the champion strategy and to action node 830 in the challenger strategy.

The cross pair graph 900 can be represented as a leveled read-once directed acyclic graph. In some implementations, the cross pair graph 900 can follow an electric circuit analogy, in which the root node and the terminal node can be replaced by horizontal lines similar to the "ground" lines in electric circuits. In this example, a logical path can be represented as a complete connection from one "ground" line 910 rendered at the top of the graph to another "ground" line 920 at the bottom of the graph. In this representation, root nodes and terminal nodes can be removed from the graph.

Generally, any condition node of a leveled structure tests identical variables as any other condition node appearing on the same level. Because the condition variable in every node within a level can be the same, this variable can be used to label the whole level rather than each node. As illustrated in FIG. 900, the variables can be displayed in a single column 930. In that representation, labeling each condition node with just the range of the condition can allow the nodes to be rendered in a more compact way.

In some implementations, the intersection of segments represented by the two compared action graphs can be represented as an empty set. For example, if the champion strategy assigns everyone with creditscore<600 to action "1" and the challenger strategy assigns everyone with creditscore>600 to action "1", then the intersection of the segments of these two strategies leading to action "1" can be represented as an empty set.

In some implementations, the empty set in a crosstabulation cell can be rendered to a user by a control within a graphical user interface. For example, this control can display a special notation (e.g. a graphical icon) associated with an empty set. In another interrelated aspect, this control can display a cross pair graph if the intersection of segments corresponding to a crosstabulation cell is not empty.

The crosstabulation methodology can provide a visual representation of the behavioral similarities and/or differences between the compared strategies. For example, it can answer questions like:

"Which actions are assigned to the same cases in both strategies" or

"Of cases who are assigned action A in the champion strategy, what actions are they assigned in the challenger strategy and why" or "Are the strategies logically equivalent" or "Is there some subset of actions that are assigned the same way by both strategies"

Figure 10:
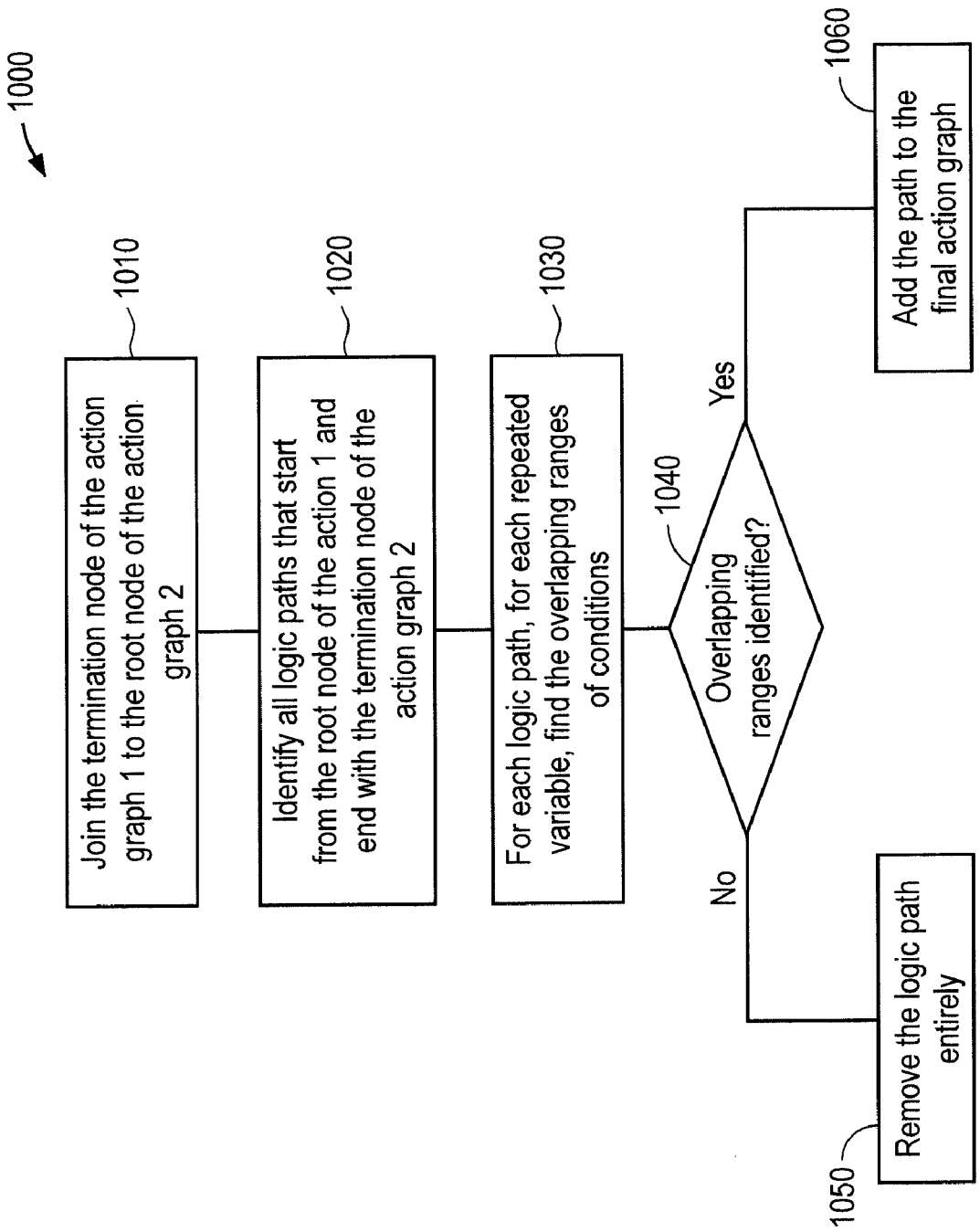
FIG. 10 is a process flow diagram illustrating an algorithm to compute a cross pair graph for a pair of actions given the two action graphs for those actions.

FIG. 10 illustrates the process flow diagram 1000 describing an algorithm that can be used for generation of the cross pair graph representing the intersection of the two compared action graphs (e.g. the first action graph and the second action graph). At 1010, the termination node of the first action graph can be joined with the root node of the second action graph to form the cross pair graph.

At 1020, all logic paths leading from the root of the cross pair graph to the terminal node can be identified. In one implementation, the paths can be identified by a software component designed to accept an action graph as an input and generate a collection of paths resulted from that action graph as an output.

At 1030, the collection of the identified paths can be iterated through to determine a list of the repeated variables within each path. Further, a set of overlapping ranges for each repeated variable can be identified. For example, a single path can have condition variables that test the value of the variable "age." Within the same path, one condition can test if "age<30," while another condition can test if "age<40." In this example, the repeated variable within the given path is "age." The overlapping range of the repeated variable "age" is "age<40" because this range can satisfy both conditions (i.e. "age<30" and "age<40").

At 1040, a determination can be made whether a given path contains any repeated variables without overlapping ranges. In that case, at 1050, the entire path can be disregarded because the test for a repeated variable without an overlapping range can never resolve to true. For example, a given path can never resolve to true if it requires that the value of the "age" variable be "<30 AND >35" simultaneously. As a result, the path that contains repeated variables without an overlapping range should not be used in the computed cross pair graph.

In some implementations, if it can be determined that the entire path does not have repeated variables, or, every repeated variable can have an overlapping range that can satisfy every test, then, at 1060, the path can be added to the final computed cross pair graph. In some aspects, the final computed cross pair graph can be optimized by a level simplification algorithm to determine the ordering of the levels that minimizes the number of nodes in the graph.

In another implementation, the strategies can be compared based on structural, rather then behavioral differences. In one aspect, two strategies can be compared with a "diff tree" display. In a "diff tree" display, the structure of one of the compared strategies can be maintained as a baseline. The structural differences of another tree can be overlaid on top of the baseline structure.

For example, each leaf in the base tree can represent a subpopulation defined by the conditions leading to that leaf node. The "base" tree can assign a single action to each of these subpopulations. In a "diff tree" display, each leaf node in the base tree can serve as a position to place the root node of a sub-tree. Each sub-tree can represent the conditional logic describing the comparison tree's treatment of the subpopulation represented by the base tree's leaf node to which it is attached.

In one implementation, the diff tree display can be useful to keep the context of one of the compared trees while understanding its differences with another compared tree. This information can be helpful to incorporate some aspects of one tree into another. In some implementations, it can become easier to determine which sets of editing steps should be incorporated, if the context of the original tree is maintained.

Figure 11:
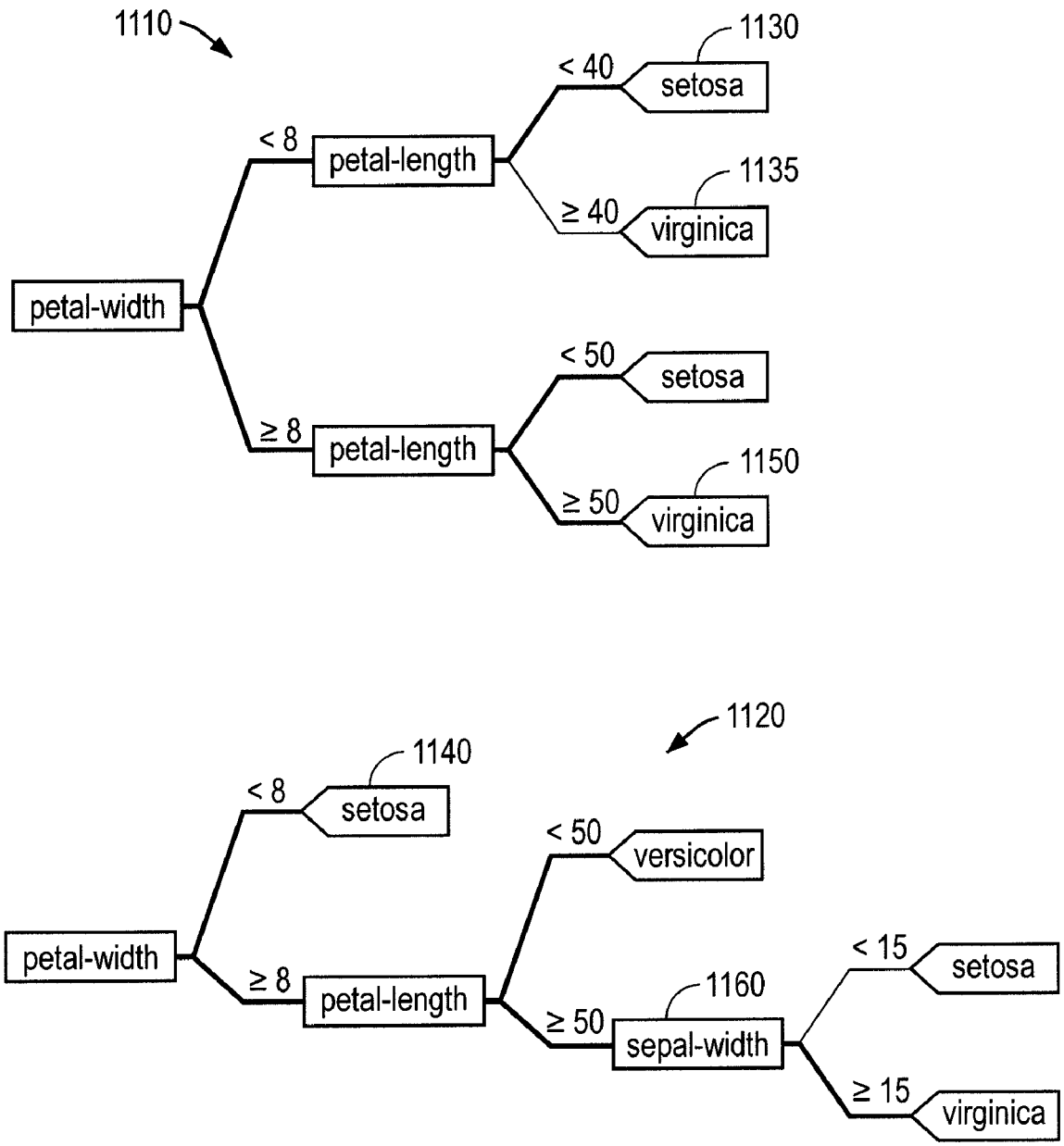
FIG. 11 is a diagram illustrating a comparison of two decision trees, with the decision tree on the left being a base tree and the decision tree on the right being a comparison tree.

For example, FIG. 11 illustrates two strategies 1110 and 1120. Each leaf node in these strategies can represent a segment of the population. In one configuration, the decision tree 1110 can be treated as a base tree, while the decision tree 1120 can be treated as the comparison tree. Each leaf of the base tree 1110 can be examined to determine how the segment it represents is treated in the comparison decision tree 1120, finding either:

The comparison tree assigns the same action to everyone in that segment.

The comparison tree assigns a different action to everyone in that segment.

Some additional segmentation (i.e. branching) is needed to describe how the comparison tree treats everyone in that segment.

Figure 12:
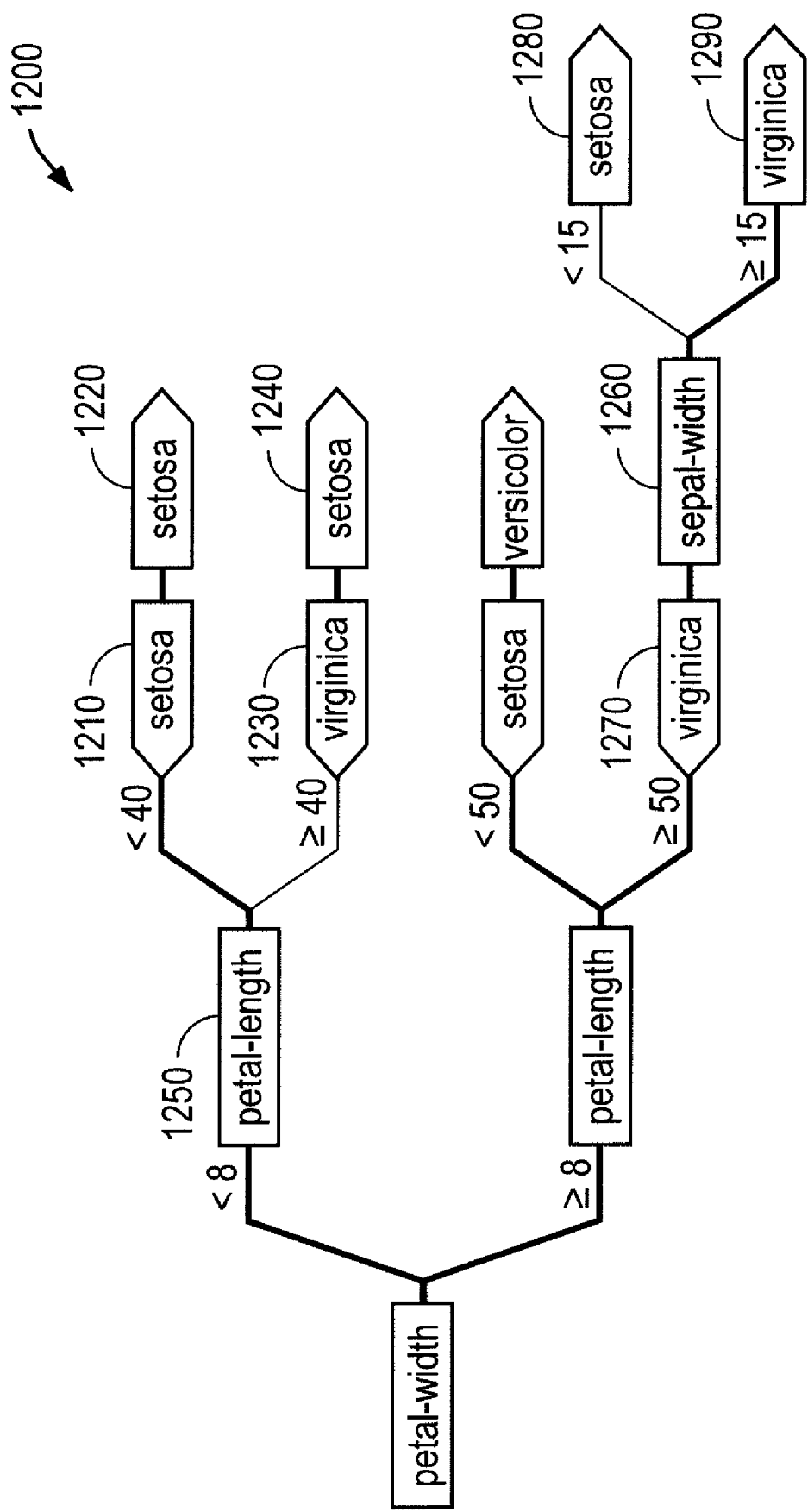
FIG. 12 is a diagram illustrating a "diff tree" display, comparing the two decision trees in FIG. 11.

FIG. 12 with the reference to FIG. 11, provides a diff tree 1200 that can represent the differences and similarities between the treatments of identical segments in the base tree 1110 and the comparison tree 1120. For example, the "setosa" leaf 1130 of the base tree 1110 can represent the segment "petal-width<8 and petal-length<40." The "setosa" leaf 1140 of the comparison decision tree 1120 can represent the segment "petal-width<8." The "setosa" leaf 1140 segment of the comparison tree 1120 is broader than the "setosa" leaf 1130 segment of the base tree 1110 in a way that it covers all cases with "petal-width<8 and petal-length<40" in addition to the cases with "petal-width<8 and petal-length≧40." Consequently, the comparison decision tree 1120 provides the same treatment "setosa" to every subject in the "setosa" leaf 1130 segment and the "virginica" leaf 1135 segment of decision tree 1110.

In some implementations, equally treated segments can be represented in the diff tree 1200 as the original leaf 1210 corresponding to the "setosa" leaf 1130 of the base tree 1110 drawn next to the secondary leaf 1220 corresponding to the "setosa" leaf 1140 of the comparison tree 1120. In some variations, the secondary leaf 1220 can be pointing to the opposite direction from the first leaf 1210. In other variations, the secondary leaf 1220 can be rendered in the same color as the original leaf 1210 to indicate that the original segment 1210 is treated equally in the comparison segment 1220.

With continued reference to FIG. 11 and FIG. 12, the second from the top leaf 1135 "virginica" of the base tree 1110 is corresponding to the "petal-width<8 and petal-length≧40." However, the comparison tree 1120 can assign all subjects with "petal-width<8" to the "setosa" leaf 1140. In some implementations, this difference can be represented in the diff tree 1200 by the original leaf "virginica" 1230 corresponding to the "virginica" leaf 1135 of the base tree 1110 drawn next to the secondary leaf "setosa" 1240 corresponding to the "setosa" leaf 1140 of the comparison tree 1120. In some variations, the leaf 1230 and the secondary leaf 1240 can be pointing to the opposite sides from each other to indicate that correspond to different trees. In some variations, the leaves 1230 and 1240 can be rendered in different colors to indicate the differences in treatment of the same segment of the population between the base tree 1110 and the comparison tree 1120.

For some diff trees, all leaves within the same branch that correspond to the leaves in the comparison tree can be rendered in the same color. For example, the "secondary" leaves 1220 and 1240 correspond to the comparison tree 1120 and are rendered in the same color. The similarity in color can indicate that the base tree 1110 has a split that is not present in the comparison decision tree 1120. In some implementations, the internal node for that branch 1250 (and any nodes for branches below it, not shown here) can be colored with the same hue as the actions in all the secondary leaves 1220 and 1240.

The bottommost leaf "virginica" 1150 of the base tree 1110 represents the segment "petal-width≧8 and petal-length≧50". While everything in this segment gets the same action in the base tree 1110, the comparison tree 1120 has an additional branch 1160 that further subdivides the treatment of the "petal-width≧8 and petal-length≧50" segment into those subjects that have "sepal-width<15" and "sepal-width≧15."

In one implementation, the additional branch 1160 in the comparison tree 1120 can be represented in the diff tree 1200 as an additional branch 1260 rendered to the right of the leaf 1270 corresponding to the base tree leaf 1150. In some variations, the leaves of the additional branch 1260 can be rendered as secondary leaves 1280 and 1290 pointing to the opposite direction from the leaf 1270 corresponding to the base tree 1110.

In some implementations, the branches of the base tree and the comparison tree can use different split variables and/or different split thresholds. For example, if branches closer to the root use different split variables or different split thresholds, then the additional segmentation in the diff tree might require sequences of branches that do not appear in either the base tree or the comparison tree.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a non-transitory machine-readable storage medium embodying instructions that when performed by one or more machines result in operations comprising:
   receiving a request to compare a first strategy to a second strategy, the first strategy graphically represented by a first set of linked nodes arranged in a first form of decision logic, the second strategy graphically represented by a second set of linked nodes arranged in a second form of decision logic;
   converting the first set of linked nodes to a logically equivalent first modified set of linked nodes arranged in a third form of decision logic, the third form of decision logic being selected from a group consisting of: decision tree, a directed acyclic graph and an exception-based directed acyclic graph;
   converting the second set of linked nodes to a logically equivalent second modified set of linked nodes arranged in the third form of decision logic; and,
   simultaneously displaying a visual representation of the first modified set of linked nodes and the second modified set of linked nodes, the visual representation being color-coded to indicate the differences and similarities between the first modified set of linked nodes and the second modified set of linked nodes.

2. The article of claim 1, wherein the third form of decision logic is leveled.

3. The article of claim 2, wherein an order of levels in the third form of decision logic is configurable by a user.

4. The article of claim 2, wherein an order of levels in the third form of decision logic is selected to minimize a number of linked nodes in at least one of the first modified set of linked nodes and the second modified set of linked nodes.

5. The article of claim 1, wherein the third form of decision logic is read-once.

6. A method for implementation by one or more data processors comprising:
   receiving, by at least one data processor, a request to compare a first strategy to a second strategy, the first strategy graphically represented by a first set of linked nodes arranged in a first form of decision logic, the second strategy graphically represented by a second set of linked nodes arranged in a second form of decision logic;
   converting, by at least one data processor, the first set of linked nodes to a logically equivalent first modified set of linked nodes arranged in a third form of decision logic, the third form of decision logic being selected from a group consisting of: decision tree, a directed acyclic graph and an exception-based directed acyclic graph;
   converting, by at least one data processor, the second set of linked nodes to a logically equivalent second modified set of linked nodes arranged in the third form of decision logic; and,
   simultaneously displaying, by at least one data processor, a visual representation of the first modified set of linked nodes and the second modified set of linked nodes, the visual representation being color-coded to indicate the differences and similarities between the first modified set of linked nodes and the second modified set of linked nodes.

7. The method of claim 6, wherein the third form of decision logic is leveled.

8. The method of claim 7, wherein an order of levels in the third form of decision logic is configurable by a user.

9. The method of claim 7, wherein an order of levels in the third form of decision logic is selected to minimize a number of linked nodes in at least one of the first modified set of linked nodes and the second modified set of linked nodes.

10. The method of claim 6, wherein the third form of decision logic is read-once.

11. A system comprising:
    one or more data processors;
    memory storing instructions, which when executed by at least one data processor, result in operations comprising:
       receiving a request to compare a first strategy to a second strategy, the first strategy graphically represented by a first set of linked nodes arranged in a first form of decision logic, the second strategy graphically represented by a second set of linked nodes arranged in a second form of decision logic;
       converting the first set of linked nodes to a logically equivalent first modified set of linked nodes arranged in a third form of decision logic, the third form of decision logic being selected from a group consisting of: decision tree, a directed acyclic graph and an exception-based directed acyclic graph;
       converting the second set of linked nodes to a logically equivalent second modified set of linked nodes arranged in the third form of decision logic; and,
       simultaneously displaying a visual representation of the first modified set of linked nodes and the second modified set of linked nodes, the visual representation being color-coded to indicate the differences and similarities between the first modified set of linked nodes and the second modified set of linked nodes.

12. The system of claim 11, wherein the third form of decision logic is leveled.

13. The system of claim 12, wherein an order of levels in the third form of decision logic is configurable by a user.

14. The method of claim 12, wherein an order of levels in the third form of decision logic is selected to minimize a number of linked nodes in at least one of the first modified set of linked nodes and the second modified set of linked nodes.

15. The system of claim 11, wherein the third form of decision logic is read-once.

* * * * *